United States Patent [19]

Young, III

[11] Patent Number: 5,098,163

[45] Date of Patent: Mar. 24, 1992

[54] CONTROLLED FRACTURE METHOD AND APPARATUS FOR BREAKING HARD COMPACT ROCK AND CONCRETE MATERIALS

[75] Inventor: Chapman Young, III, Steamboat Springs, Colo.

[73] Assignee: Sunburst Recovery, Inc., Steamboat Springs, Colo.

[21] Appl. No.: 564,595

[22] Filed: Aug. 9, 1990

[51] Int. Cl.⁵ .................... F21C 37/14; F42D 3/04
[52] U.S. Cl. ................................ 299/13; 89/33.1; 299/16
[58] Field of Search .................... 299/13, 16, 14; 175/4.5, 4.75; 102/430; 89/33.1

[56] References Cited

U.S. PATENT DOCUMENTS

| | | | |
|---|---|---|---|
| 1,189,011 | 6/1916 | Smith | 102/430 |
| 1,585,664 | 5/1926 | Gilman | 299/13 |
| 2,799,488 | 7/1957 | Mandt | 299/13 |
| 3,055,648 | 9/1962 | Lawrence et al. | 299/13 X |
| 3,421,408 | 1/1969 | Badali et al. | 89/33.1 |
| 3,623,771 | 11/1971 | Sosnowicz et al. | 299/12 |
| 3,721,471 | 3/1973 | Bergmann et al. | 299/55 |
| 3,735,704 | 5/1973 | Livingston | 102/332 |
| 3,848,927 | 11/1974 | Livingston | 299/13 |
| 3,975,056 | 8/1976 | Peterson | 299/42 |
| 3,988,037 | 10/1976 | Denisart et al. | 299/16 |
| 4,123,108 | 10/1978 | Lavon | 299/16 |
| 4,141,592 | 2/1979 | Lavon | 299/16 |
| 4,149,604 | 4/1979 | Lockwood et al. | 175/57 |
| 4,165,690 | 4/1979 | Abrahams | 102/314 |
| 4,195,885 | 4/1980 | Lavon | 299/1 |
| 4,204,715 | 5/1980 | Lavon | 299/16 |
| 4,289,275 | 9/1981 | Lavon | 299/17 X |
| 4,501,199 | 2/1985 | Mashimo et al. | 102/313 |
| 4,508,035 | 4/1985 | Mashimo et al. | 102/313 |
| 4,582,147 | 4/1986 | Dardick | 175/1 |
| 4,655,082 | 4/1987 | Peterson | 299/1 X |
| 4,669,783 | 6/1987 | Kolle | 299/16 |
| 4,900,092 | 2/1990 | Van Der Westhuizen et al. | 299/13 |

FOREIGN PATENT DOCUMENTS 800883 9/1958 United Kingdom .................. 299/16

OTHER PUBLICATIONS

Sunburst Recovery, Inc., "Controlled Fracture Techniques for Continuous Drill and Blast", NSF Report, Jul. 1984.

Bligh, "Principles of Breaking Rock Using High Pressure Gases", Advances in Rock Mechanics, Denver 1974.

(List continued on next page.)

*Primary Examiner*—David J. Bagnell
*Attorney, Agent, or Firm*—James Creighton Wray

[57] ABSTRACT

Hard compact materials, such as rock, concrete, et cetera, are broken by igniting an appropriately designed explosive or propellant charge placed within the hole or carried in a special charge-containing device with a short barrel which is inserted and sealed into a predrilled hole of particular geometry. One or more approximately cylindrical holes are drilled into the material to be broken by conventional drilling, such as used in the mining and construction industries. The holes have a relatively short depth to diameter ratio, being in the range of about 2:1 to 6:1, and preferably about 3:1 to 5:1. The holes are percussively drilled with microfractures in and around hole bottoms to provide fracture initiation sites at the hole bottoms so as to provide preferred fracture initiation roughly parallel to a free surface of material being excavated. The explosive or propellant charges may be any of several commercially available explosives or propellants, including standard military and commercial rifle powders and various recently developed liquid propellants. The propellant charges, whether solid or liquid, may be placed and ignited within a charge-containing device, which includes a short barrel inserted into the holes drilled into the material to be broken. The barrel of this device may be further sealed into the holes by a helical shim sealing method.

24 Claims, 7 Drawing Sheets

OTHER PUBLICATIONS

Anderson et al., "Laboratory Testing of a Radial-Axial Loading Splitting Tool", Bureau of Mines Report 8722, 1982.

Bjarnholt, "On Fracture Initiation . . . ", Swedish Detonic Research Foundation, 1983.

Bjarnholt et al., "A Linear Shape Charge System for Contour Blasting", Ibid, 1983.

Clark et al., "Rapid Excavation of Rock with Sma-1 Charges of High Explosives", Bureau of Mines H0272020, 1979.

Cooper et al., "A Novel Concept for a Rock-Breaking Machine . . . ", Institute Cerac S.A., Switzerland, 1980.

Dalley et al., "Fracture Control in Construction Blasting", University of Maryland, 1977.

Louie, "Quasi-Continuous Explosive Concepts for Hard Rock Excavation", Shock Hydrodynamics Division, Whittaker Corp., ARPA, Jun. 1973.

Lundquist, "Underground Tests of the Ream Method . . . ", Physics International Co., San Leandroa, Calif., 1974.

Lundquist et al., "Continuous Spiral Blast Tunneling", Rapidex, Inc., Peabody, Mass., 1983.

Singh, "Rock Breakage by Pellet Impact", DOT, FRA-RT-70-29, 1969.

Young, "Rock Breakage with Pulsed Water Jets", ASME, 77-PET-78, 1977.

Young, "Combined Water Jet for Rapid Rock Excavation", NSF, CEE 8460891, 1985.

Young et. al., "Fracture Control Blasting Techniques for Oil Shale Mining", Eastern Oil Shale Symposium, 1983.

Zink et al., "Water Jet Uses in Sandstone Excavation", Stoneage, Inc., Durango, Colo., 1983.

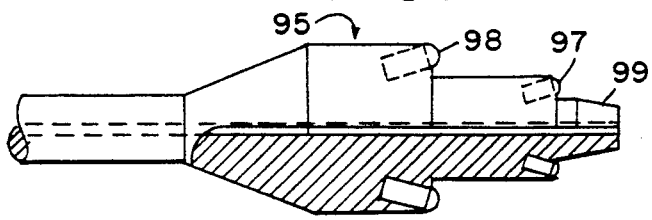
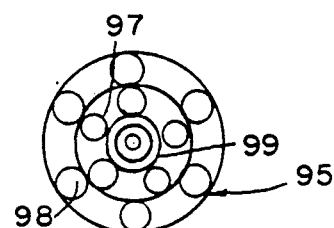
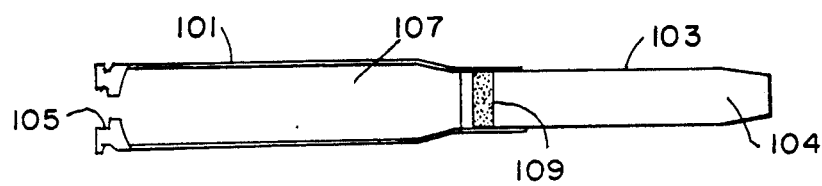
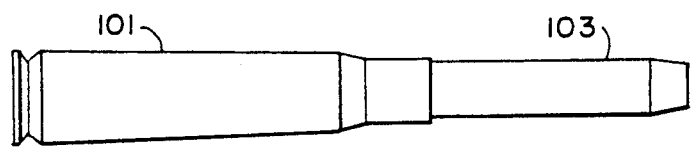
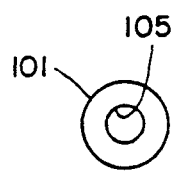
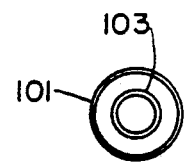

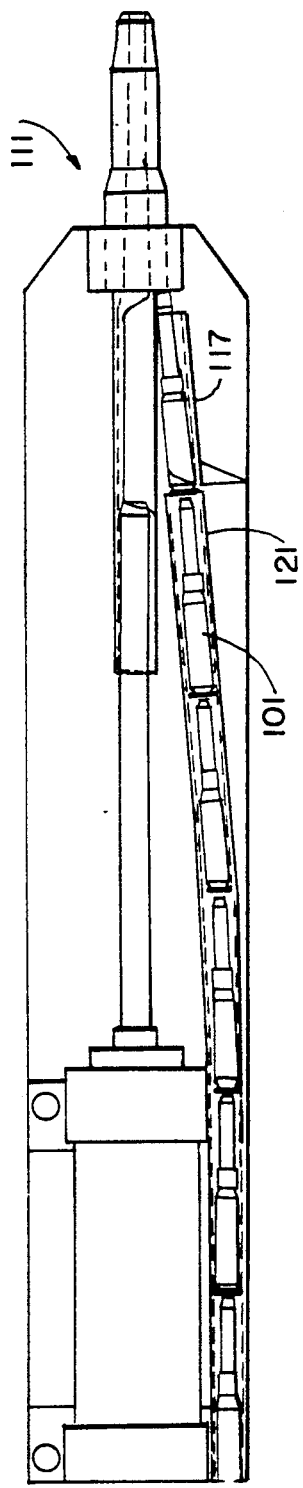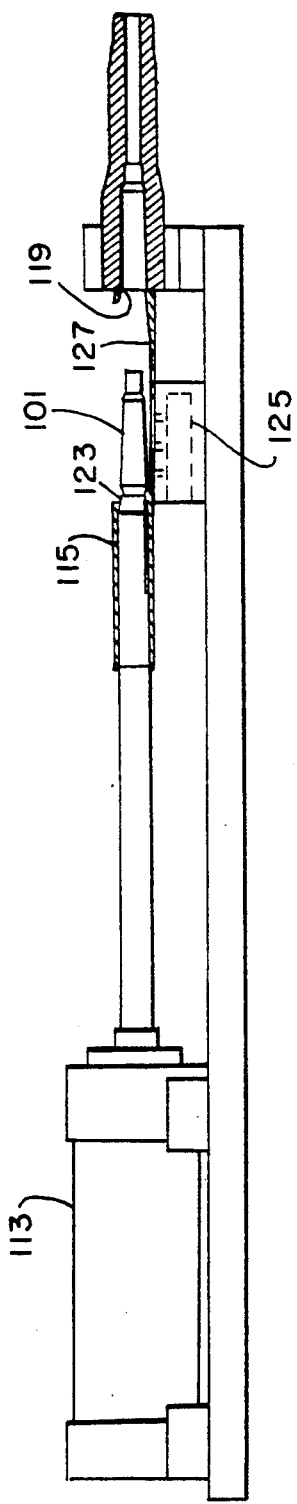

CONTROLLED FRACTURE METHOD AND APPARATUS FOR BREAKING HARD COMPACT ROCK AND CONCRETE MATERIALS

BACKGROUND OF THE INVENTION

Since the invention of dynamite in 1866, explosive blasting has been the primary technique utilized for the excavation of hard rock. Despite many improvements in rock excavation technology over the years, methods suitable for the continuous excavation of hard rock do not yet exist, whether for mining or civil construction. Conventional drill and blast remains the only technique which may be utilized to excavate the harder rocks, such as granite and gneiss, with reasonable efficiency. Numerous mechanical and water jet assisted systems have been developed for the efficient excavation of softer, typically sedimentary rocks. Recent improvements in tunnel boring machines have allowed these machines to cut relatively hard rock up to 300 MPa in compressive strength, but cutter wear remains a serious problem. These systems are not able to effectively excavate the harder rocks, however. Also the TBM type of machines are limited in their mobility and in their ability to cut irregularly shaped openings.

Conventional drill and blast, while being able to excavate the hardest of rocks at acceptable efficiencies, is limited, in that the technique must be applied in a cyclic drill, blast and muck fashion, resulting in the inefficient and often interfering use of the machines required for each cycle. Conventional drill and blast is also limited, in that considerable damage is done to the rock left around the structure being excavated, with this residual damage often requiring additional and expensive ground support. For commercial mining operations, the conventional drill and blast method is limited, in that all of the rock excavated from a mine heading in a single drill and blast round is so jumbled and mixed that all of the rock must be removed from the mine, crushed, milled and processed for ore removal. Numerous mining operations involve the excavation of vein-type deposits, where the ore-bearing rock is restricted to a small section of the excavation face. A method whereby the ore-bearing rock could be selectively mined and transported to the surface for milling and extraction, with the remaining barren rock being left underground, would significantly improve the economics of many mining operations. For civil construction, the conventional drill and blast method is often limited, in that the large air blast and ground shock associated with each blast preclude the method being utilized in urban construction. Also the residual damage caused to the remaining rock often compromises the mechanical integrity of the structure, requiring additional and expensive ground support.

RAPID EXCAVATION TECHNIQUES

Due to the inherent limitations of conventional drill and blast methods as discussed above, considerable research has been devoted over the past 20 years to the development of alternative rapid excavation techniques suitable for hard rock. The approaches which have been considered during these two decades of research have ranged from water-jet impact (Young, 1977) through high-velocity projectile impact (Lundquist, 1974), to small-charge blasting (Lundquist and Peterson, 1983). Both continuous (Zink et al., 1983) and pulsed water-jet impact techniques (Young, 1977; Young, 1985) have been investigated in considerable detail. In general, the continuous water-jet techniques cannot generate water-jet pressures high enough to efficiently cut the harder rocks. While the pulsed water-jet impact techniques can cut the hardest of rocks, the energy efficiency of these techniques and the mechanical complexity of the pulse-jet generating devices has hindered the commercial development of the techniques. Rapid excavation techniques based upon projectile impact have included consideration of a very small projectile (pellet) impact (Singh, 1960), very large projectile impact where the projectiles might be launched with conventional 104 mm military cannons (Lundquist, 1974), and have even included consideration of explosive projectiles which would increase the rock damage by their detonation upon impact (Louie, 1973). The poor efficiencies of the small pellet impact approaches have precluded their development, while the very large air blast problems inherent in the large projectile and explosive pellet approaches have hindered their commercial development.

SMALL-CHARGE BLASTING

Due to the relative efficiency characteristic of conventional drill and blast techniques, considerable research has been devoted to the scaling down and automation of drill and blast approaches so they might be applied on a small-charge continuous drill and blast basis. Most notable among these approaches is the Rapidex spiral drill and blast system, which received considerable research consideration during the 1970s (Lundquist and Peterson, 1983). Interest in the further development in continuous drill and blast techniques has been limited due to the relatively large explosive loadings that are still required in the scaled-down systems, and the consequent requirement that considerable effort would need to be devoted to protecting both machines and personnel operating at or near the excavation face. The explosive quantities in these continuous drill and blast approaches often remained high because conventional charge loadings were employed and several shot holes were typically required to be detonated nearly simultaneously for proper operation of the technique (Clark et al., 1979).

FRACTURE CONTROL BLASTING

A third approach to the development of more efficient excavation techniques involved the consideration of methods for applying controlled fracture techniques to the rock breaking process. As less than one percent of the total energy expended in conventional drill and blast is utilized to develop the desired tensile fractures within the rock, it is quite attractive to investigate methods by which the energy required for rock fracture may be much more efficiently applied to the fracturing process. Controlled fracturing techniques recently developed by the University of Maryland (Dally and Fourney, 1977), the Swedish Detonic Research Foundation (Bjarnholt et al., 1983) and elsewhere (Young and Fourney, 1983) have shown that, with proper fracture initiation and control, the quantity of explosive charges required to achieve a given desired fracturing can be significantly reduced. Other research into the controlled fracture of rock has resulted in the development of both static and dynamic techniques, wherein the geometry of the breakage process might significantly reduce the energy requirements. In general, these approaches involve methods whereby the primary rock breaking fractures could be developed roughly parallel to a free face, resulting in less energy being required for fracture development. One static method based upon this approach involves a mechanical device which could act in a relatively shallow borehole and by means of grippers, could pull (spall) the rock toward the free face from which the hole was drilled (Cooper et al., 1980, Anderson and Swanson, 1982). A dynamic approach employing a comparable geometry involved the firing of steel pistons into shallow water-filled holes, such that the rapid pressurization of the hole would result in the initiation an propagation of a fracture from the stress concentration occurring at the sharp corner at the hole bottox: (Denisart et al., 1976). A fracture so initiated would tend to propagate out from the hole and parallel to the free face from which the hole was drilled. While this approach yielded very attractive rock excavation efficiencies, difficulties with the rapid loss of the pressurization liquid when fracturing other than from the hole bottom occurred, and with the frequent jamming of the steel pistons in incompletely broken holes, precluded the further commercial development of the technique. In order to avoid the piston jamming problem, a method utilizing high pressure, high velocity slugs of water fired into shallow holes has also been proposed (Lavon, 1980).

Based upon the excellent rock breakage efficiencies which could be obtained with fracture control techniques applied to specialized rock breakage geometries, and the premise that better methods for pressurizing and propagating these fractures could be developed, small research effort in 1984 demonstrated that small explosive or propellant charges could be utilized to effectively apply controlled fracture techniques to unique rock breaking geometries (Young and Barker, 1984). The primary geometry considered is illustrated in FIG. 1 and was based in part upon the geometry proposed by Denisart et al. (1976). As indicated in FIG. 1, this fracturing is predicated upon the initiation and propagation of a fracture from the bottom of a shallow and rapidly pressurized borehole. Such a fracture could be expected to propagate initially down into the rock and to then turn towards the free surface as surface effects became important, thus resulting in the removal of a large volume of rock. The residual cone left on the rock face by the initial penetration of the fracture into the rock provides the basis for the name (penetrating cone fracture, or PCF) given to this type of fracturing. In contrast with the earlier work of Denisart et al., later research efforts considered the possibilities for initiating and propagating cone fractures from shallow boreholes with small propellant and decoupled explosive charges (Young and Barker, 1984).

SUMMARY OF THE INVENTION

The intention of the present invention is to disclose a continuous drill-and-blast rapid excavation system (apparatus and method) based upon the penetrating cone fracture (PCF) approach.

The excavation of hard rock for both mining and civil construction applications is usually accomplished with the traditional drill and blast method. Due to the cyclic nature of drill and blast operations (drill, blast, ventilate and muck), excavation rates are limited and equipment utilization is low. A small-charge rapid excavation system employing a novel fracture initiation and propagation technique has been demonstrated to be capable of excavating the hardest of rocks at efficiencies (energy per unit volume of rock removed) four to ten times greater than attainable with conventional drill and blast. Significant enhancements to the concept include the use of propellant rather than explosive charges, and the design of devices for containing the charges and effectively sealing the shot holes.

It is the object of this invention to provide an improved rapid excavation method and apparatus. A machine is disclosed integrating drilling, small-charge blasting and mucking that remains at the excavating face during continuous operations. An excavation method using the machine involves: optimizing rock breakage with the penetrating cone fracture technique; establishing optimum hole patterns and cone fracture interactions through spacing and placement; optimizing borehole sealing by incorporating established stemming parameters and new sealing techniques; and optimizing continuous drilling, blasting and mucking operations by incorporating established rock breakage parameters, drilling parameters, and propellant (explosive) charge parameters. Furthermore, the machine could incorporate robotic control into a smart system capable of optimizing shot hole placement and geometry and charge characteristics for specific rock conditions.

The small-charge rapid excavation system would be attractive for mining and civil construction operations where sensitive structures, equipment and personnel would be in close proximity to the excavation face. The small-charge rapid excavation system would be attractive in selective mining operations where the ore rock could be fragmented and processed separately from the barren country rock. The barren rock could then be kept underground and eliminated from the traditional hauling and milling operations.

Hard compact materials, such as rock, concrete, et cetera, are broken by igniting an appropriately designed explosive or propellant charge placed within the hole or carried in a special charge-containing device with a short barrel which is inserted and sealed into a pre-drilled hole of particular geometry. One or more approximately cylindrical holes are drilled into the material to be broken by conventional drilling means, such as used in the mining and construction industries.

The holes have a relatively short depth to diameter ratio, being in the range of about 2.5 to 1 to 10 to 1, and preferably about 3 to 1 to 5 to 1. The holes may be drilled with sharp hole bottoms so as to enhance fracture initiation at the hole bottoms, or may be notched at the hole bottom or at other locations so as to provide for preferred fracture initiation. Microfracturing from percussive drilling is extremely beneficial to the process by providing fracture initiating sites.

The explosive or propellant charges may be any of several commercially available explosives or propellants, including standard military and commercial rifle powders and various recently developed liquid propellants.

The propellant charges, whether solid or liquid, may be placed and ignited within a charge-containing device, which includes a short barrel inserted into the holes drilled into the material to be broken. The barrel of this device may be further sealed into the holes by means of a helical shim sealing method or by having a slight shoulder on the barrel pressed against a slight step on the hole wall. The charge-containing device is prevented from being accelerated out of the hole by means of a heavy steel bar or comparable structure held against the rearward end of the charge-containing device.

With the controlled pressurization of the hole, realized with the proper combinations of explosive and/or propellant charge, the charge-containing device, hole sealing method and restriction of the charge or charge-containing device within the hole by heavy steel bar or structure, a controlled fracturing of the material may be realized.

One preferred fracturing involves the initiation and propagation of a fracture from the hole bottom such that the fracture propagates roughly parallel to the surface in which the hole was drilled.

This fracture will propagate with a lower expenditure of energy due to its relation to the free surface, and will thus remove and excavate the material more efficiently than will conventional drilling and blasting or boring. Due to the lower energies required for effective breakage of the material, the velocity imparted to the broken material is lower than for conventional blasting, and thus machines and/or personnel may remain close to the face being drilled and excavated, allowing for the continuous operation of the process.

These and further and other objects and features of the invention are apparent in the disclosure, which includes the above and ongoing written specification, with the claims and the drawings.

BRIEF DESCRIPTION OF THE DRAWINGS

FIGS. 9A and B illustrate a multiple stepped drill bit providing the small diameter change for borehole sealing, and the larger borehole change for gun clearance. The deepest, narrowest portion of the borehole is where rapid pressurization occurs and PCF breakage is initiated.

FIGS. 10A, B, C and D give details of a standard 50 caliber cartridge with a hollow shell to carry additional propellant.

FIGS. 11A and B are a schematic of the charge and blast apparatus showing the breech mechanism of the PCF gun. Modified 50 caliber cartridges are used.

DETAILED DESCRIPTION OF THE DRAWINGS

Figure 1:
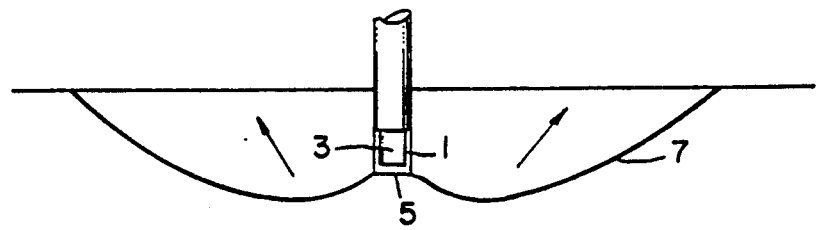
FIG. 1 is a schematic view of prior art penetrating cone fracture development from a rapidly pressurized borehole. The figure illustrates a general cone fracture (PCF) trajectory.

FIG. 1 illustrates the prior art penetrating cone fracture (PCF) development which occurs when a substantially cylindrical borehole 1 is sealed and a propellant or explosive charge 3 is ignited within the hole. During combustion, the borehole is rapidly pressurized, and rock fracture is initiated along the perimeter of the hole bottom 5. The initial fracture typically propagates down into the rock and then turns towards the free surface as the surface effects become a factor. In contrast with earlier work done in this area, the penetrating cone fractures 7 in this disclosure are created using shallow boreholes with small propellant charges.

Figure 2:
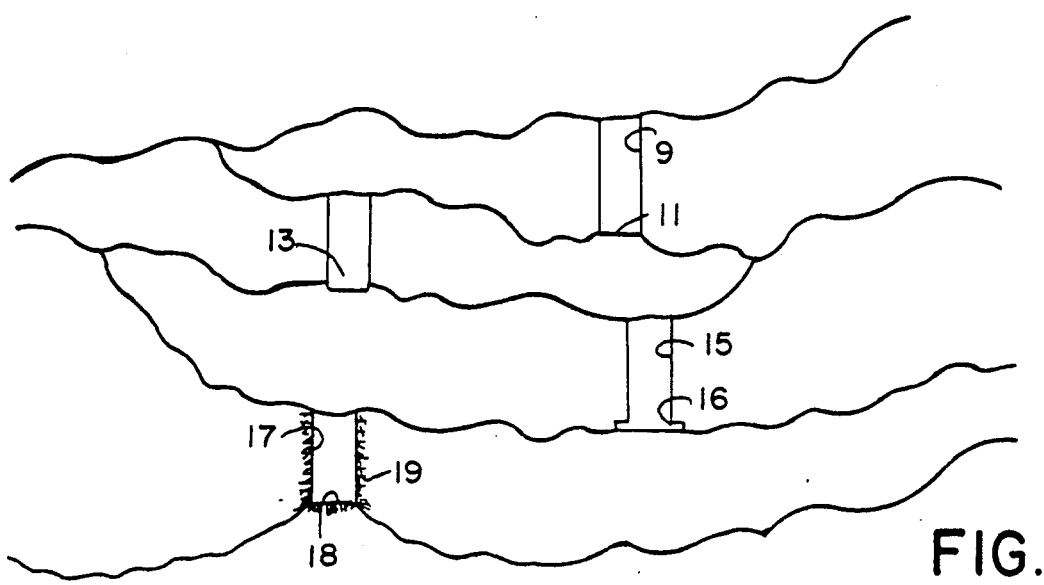
FIG. 2 provides details of cored, rounded, notched and percussively drilled hole bottoms evaluated in laboratory tests. Good cone fracture initiation was obtained in all of the percussively drilled holes.

FIG. 2 illustrates various hole types that can be used to facilitate PCF breakage. A hole 9 may be drilled having a hole bottom 11 with a sharp 90° corner. A rounded or worn carbide tip bit provides a hole bottom 13 with a rounded radius. Such a rounded hole bottom is detrimental. Another bit could be used which creates a cylindrical hole 15 that is notched 16 at the bottom of the hole, perpendicular to the sidewall of the hole. Extremely sharp, if not notched, borehole bottoms are conducive to successful cone fracture initiation. Preferred holes 17 and bottoms 18 are generated by a percussive drill bit. Although less sharp than the diamond core drilled hole bottoms, the percussively drilled holes 17 and bottoms 18 produce very good cone fracture initiation. The additional microflaw damage 19 induced in the rock by percussive drilling, particularly at the hole bottom radius, is more than adequate for consistent fracture initiation. Thus, the preferred percussive drilling of the borehole eliminates the necessity for construction of a specific hole bottom geometry.

Figure 3A:
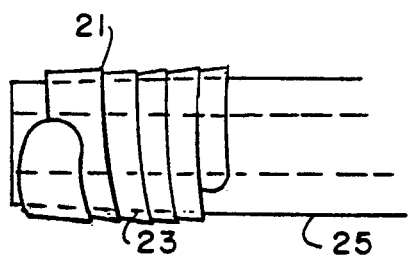
FIGS. 3A, B and C are details of a mine gun having a tapered nozzle section and a helical shim for simple and effective sealing of the mine gun barrel in PCF holes.

FIG. 3A illustrates a borehole sealing method using a brass shim strip 21 helically wrapped about the tapered section 23 of a mine gun barrel 25. While a simple cylindrical barrel mine gun may be used to seal the borehole, using the helical shim seal allows for better containment of gas pressure and higher peak pressure. The helical shim effectively cuts down on the escape of propellant gases during pressurization and fracture propagation, and also reduces erosion about the exterior of the mine gun barrel.

Figure 3B:
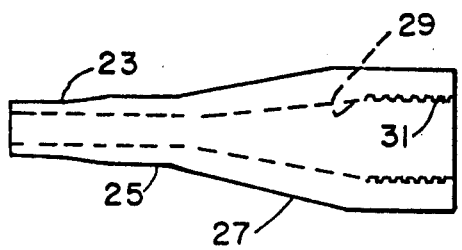
Figure 3C:
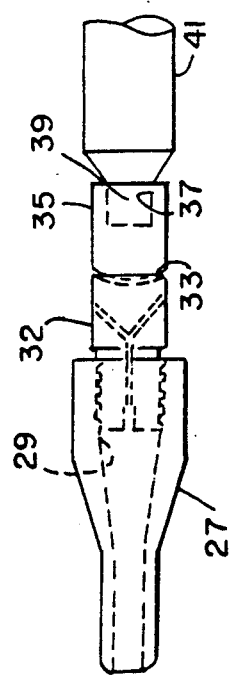

FIGS. 3B and 3C show a mine gun 27 with a propellant charge breech 29 and a threaded breach 31 which receives a plug closure 32. A ball and socket joint 33 has a stub 35 with a bore 37 which receives an end 39 of stemming bar 41.

Figure 4:
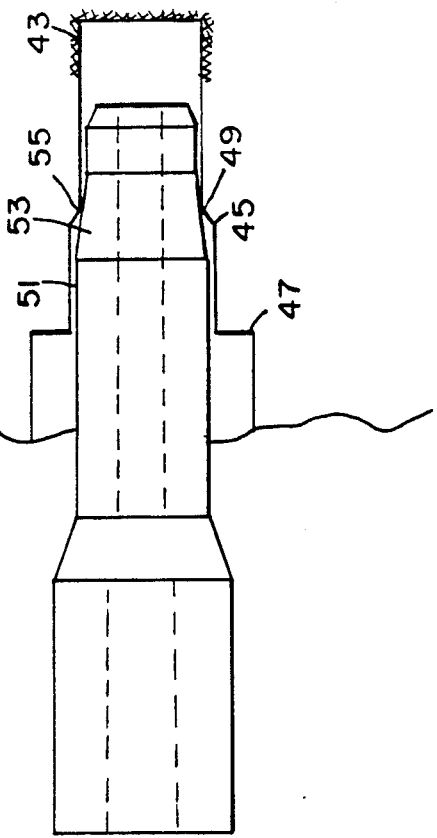
FIG. 4 further details the taper on the PCF gun barrel for improved borehole sealing, and also illustrates a double stepped borehole design.

FIG. 4 shows another sealing means using a mine gun barrel particularly designed to seal a borehole 43 with double steps 45 and 47. The borehole is drilled so that a very small diameter change occurs at the sealing shoulder 49. Having a too-large diameter at the shoulder would allow significant chipping or fracturing to occur at the shoulder during pressurization, thus permitting gas pressure loss and hindering PCF breakage. The preferred small diameter change reduces such chipping or fracturing at the shoulder. The gun barrel 51 is tapered 53 to partially fit within the PCF hole 43 and form a seal 55 at the sealing shoulder 49.

Figure 5:
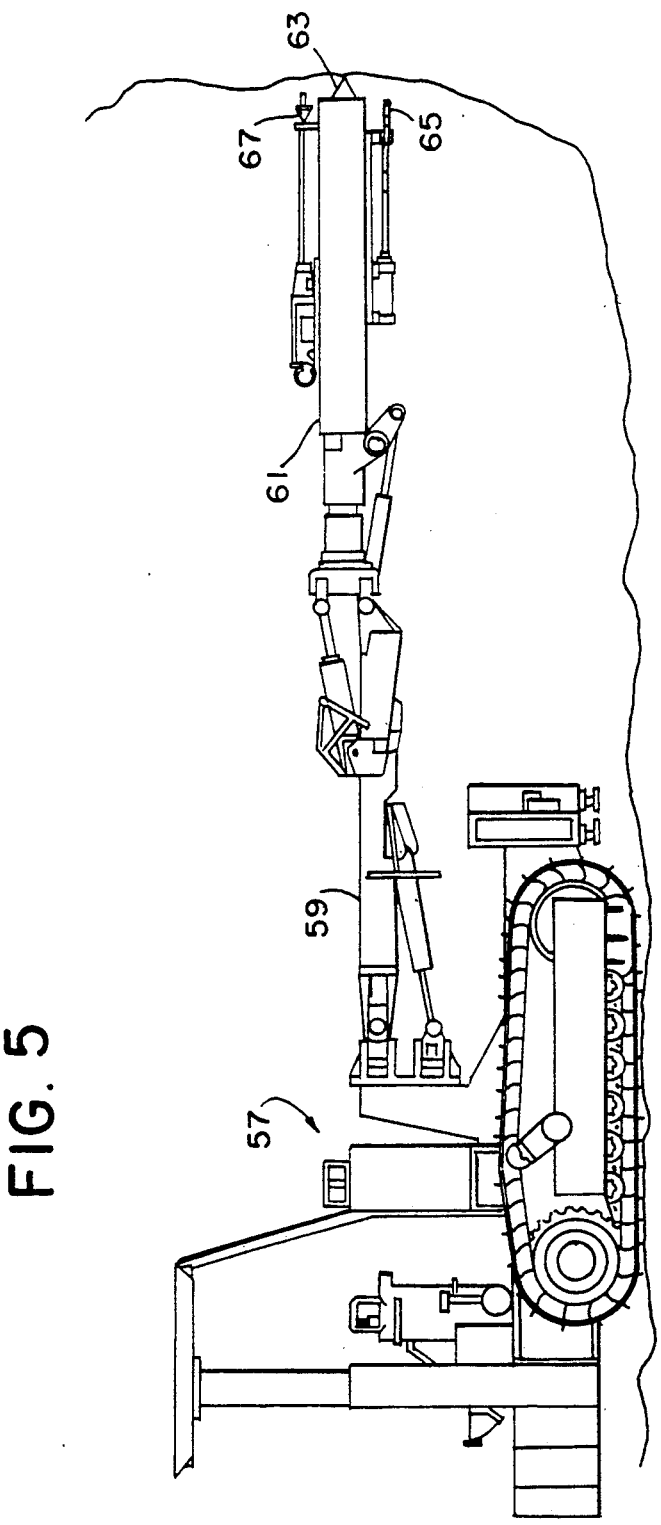
FIG. 5 illustrates a possible machine configuration using a drilling machine equipped with a boom that carries the PCF drill and PCF gun.
Figure 6:
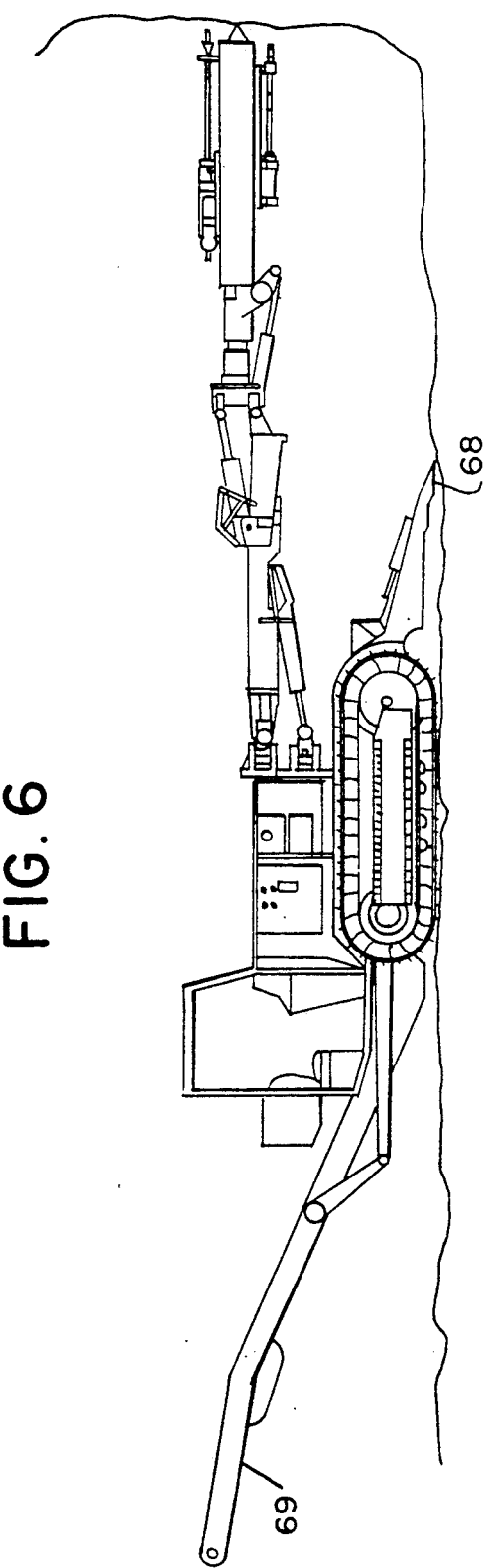
FIG. 6 shows another possible configuration of the machine in which a mining machine chassis is modified with a boom for the PCF drill and PCF gun. A mucking apron and conveyor system is also illustrated.

FIGS. 5 and 6 illustrate embodiments of the mining apparatus. Commercially available crawler-type mining machines 57 are used in conjunction with one or more booms 59. The booms have rotational capabilities about their long axis. An extension 61 is mounted on the boom, containing hydraulic cylinders and having forward movement capabilities along the long axis of the boom. A pivot cone 63 is mounted on the extension and determines the axis of rotation for drill and blast sequences. The PCF gun 65 and the excavation drill 67 are mounted on opposing sides of the extension 61. A mucking apron 68 and conveyor system 69 are be attached to the mining carriage.

Figure 7A:
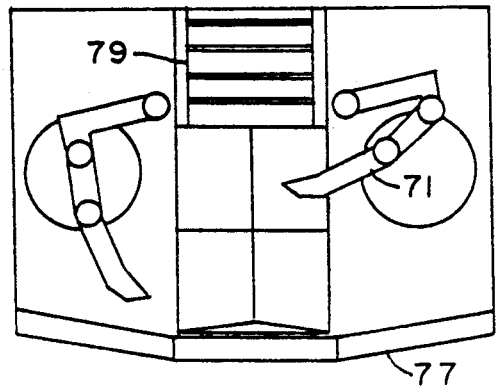
FIGS. 7A, B and C show three possible toe mucking systems that are available for the modified miner chassis shown in FIG. 6.
Figure 7B:
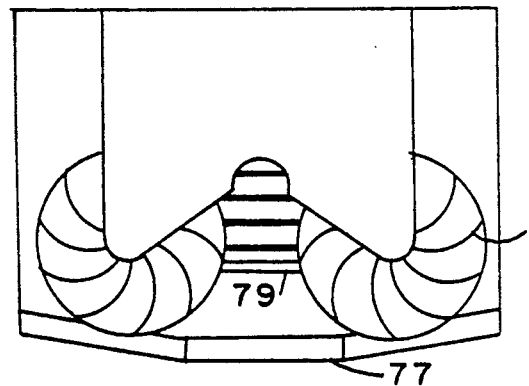
Figure 7C:
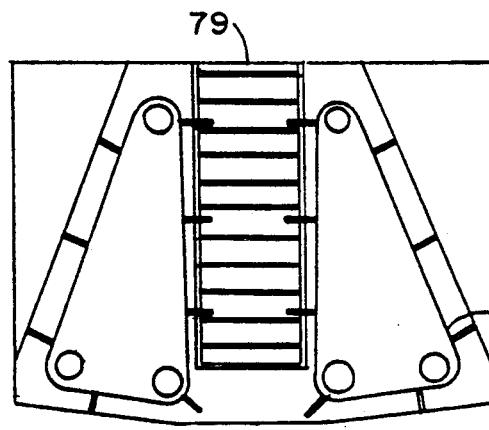

FIGS. 7A, B and C show three possible prior art mucking systems for use with the mining apparatus of the present invention. The standard mucking options use gathering arms 71, collection disks 73, or loading chains 75. Toe plates 77 and conveyors 79 are included. Machines equipped with pineapple or drum pick cutters are standard. Rock fragments generated in many mining operations consistently are fine and are readily handled by either the gathering disk or loading chain option. For machines modified with two booms and PCF drilling and charge handling equipment, the rock fragment size distribution generated includes more large fragments and fewer smaller fragments, and the gathering arm option would generally be preferable. Mucking is continuous while holes are drilled and blasted.

Figure 8:
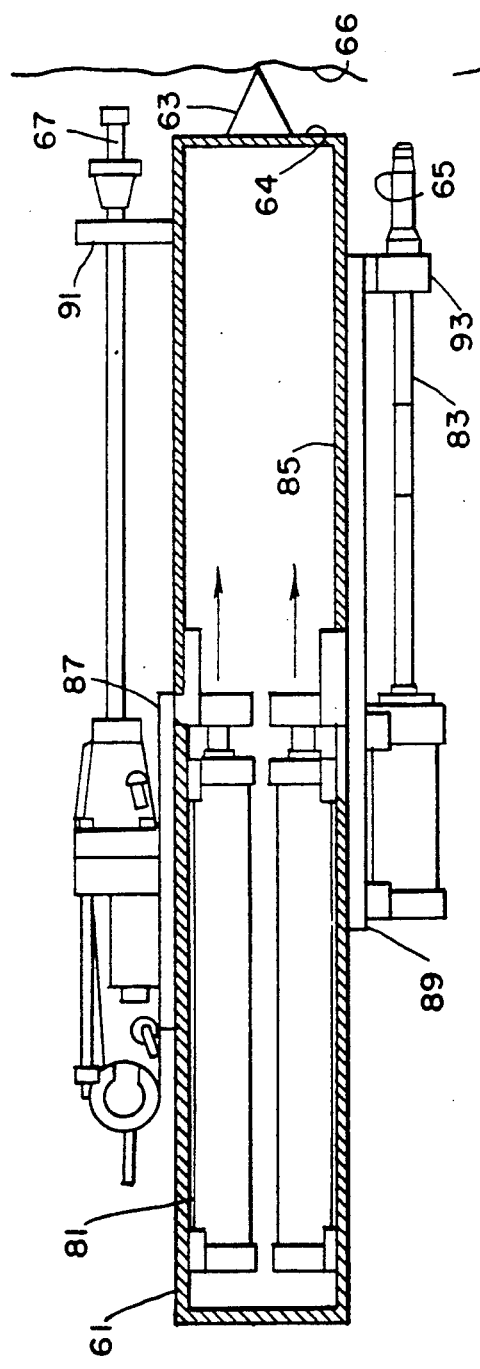
FIG. 8 provides a more detailed illustration of the PCF boom extension with drilling, charge handling and firing capabilities.

FIG. 8 illustrates the boom extension 61 having internal hydraulic cylinders 87, drilling 67, charge handling 83, and firing 65 capabilities. The hydraulic cylinders are contained within a sealed tube chassis 85. The extension is attached to the boom by a mounting plate. The drill 67 and gun 65 of both are mounted on the extension 61 with slide plates 81 and 89, and are further supported by cradles 91 and 93. The index pivot point 63 is centered on the end 64 of the extension 61 that is roughly parallel to the excavation face 66.

FIGS. 9A and B give details of the special carbide steel drill bit 95 used to create the small diameter change borehole for one of the sealing options. The three component combination bit includes steel carbide inserts 97, 98 for the stepped portions of the bit. A small diameter lead bit is carried on cone 99 for drilling the cone fracturing portion of the hole should experience the greatest amount of wear, and is separately replaceable.

FIGS. 10A, B C and D illustrate a 50 caliber cartridge 101 with a hollow shell 103 to carry additional propellant 104. The hollow shell or boot may be manufactured of plastic or aluminum. The aluminum shells or boots react somewhat with the burning propellant, providing for additional propellant energy, and the melted aluminum serves to further improve borehole sealing at the slightly stepped radius shoulder. For a slightly larger scale of PCF breakage or for an operation requiring considerably more propellant charge, standard 20 millimeter military cartridges may be used. Shell 101 has a primer cup 105, a primary charge 107 and an optional wadding 109.

FIGS. 11A and B show a breech mechanism for the PCF gun 111 utilizing modified 50 caliber cartridges 101. The gun has a simple, double acting hydraulic cylinder 113 to activate the breech block or bolt 115 shown in the figure. A swinging feed gate 117 is used to position the cartridges in alignment with the breech 119 as they are received from the cartridge feed tube 121. Swinging gate 117 is activated by an air or hydraulic cylinder. Cartridge removal is effected by a simple mechanical spring clip 123 A small air jet manifold 125 placed beneath a cartridge guide tube 127 of the gun is used for cartridge ejection.

Liquid propellants are particularly suited for use in the invention. The gun barrel is inserted, stemmed and sealed in a percussively drilled shouldered hole. Liquid is supplied to the chamber through an opening, the opening is closed, and the liquid propellant is ignited. Fractures propagate from sites at the hole bottom, and a large, generally flat excavated portion is broken up and falls from the face for mucking and conveying out of the mine.

While the invention has been described with reference to specific embodiments, modifications and variations of the invention may be constructed without departing from the scope of the invention, which is described in the following claims.

I claim:

1. A rapid excavation apparatus using penetrating cone fracture breakage techniques, comprising:
   a mining machine;
   a boom mounted on the mining machine;
   a drill mounted on said boom means having a drill bit for drilling a hole in an excavation face;
   a mine gun mounted on the boom for inserting in the hole;
   the gun having a receiver and a barrel;
   a borehole sealing means and stemming bar connected to the gun for holding the gun sealed in the hole.

2. The apparatus of claim 1, further comprising a cartridge for holding a charge in the receiver.

3. The apparatus of claim 1, wherein the boom is rotatable for indexing between aligning the drill and the gun with the borehole.

4. The apparatus of claim 1, having a chamber and closure in the gun for holding a propellant.

5. The apparatus of claim 1, having along its longest axis hydraulic actuators for alternately and separately advancing the drill and the gun toward the face.

6. The apparatus of claim 1, wherein the boom has an attached steel tube boom extension with internal hydraulic cylinders, a boom mounting plate on one end, and a pivot cone on the other end.

7. The apparatus of claim 6, wherein the boom extension is a steel tube in which the hydraulic actuators are carried.

8. The apparatus of claim 6, wherein the boom has a first attachment on its outer surface for the drill, the first attachment comprising a drill slide plate and a drill cradle, and also having a second attachment for the gun, the second attachment comprising a gun slide plate and a gun cradle.

9. The apparatus of claim 1, wherein the sealing means comprises a cylindrical mine gun barrel with a slightly tapered portion which is helically wrapped with a brass shim.

10. The apparatus of claim 1, further comprising a cartridge with propellant charge in the receiver of the gun.

11. The apparatus of claim 10, further comprising a magazine and loader connected to the gun for loading cartridges into the receiver.

12. The apparatus of claim 11, further comprising a cartridge extractor and ejector connected to the gun.

13. A method for rapid excavation using controlled penetrating cone fracture breakage techniques comprising performing a substantially continuous and sequential series of drilling and blasting operations, each successive sequential series of which being advanced further in the direction of excavation, the sequential series of steps further comprising:

positioning a pivot point of a boom on an excavation face;
   advancing a drill toward the face;
   drilling a hole of predetermined aspect ratio;
   removing the drill from the face;
   indexing the drill out of alignment with the hole and indexing a gun mounted on the boom into alignment with the hole;
   advancing the gun into the borehole;
   sealing the borehole with a sealing means on the gun;
   loading a propellant charge into the gun and igniting the charge;
   withdrawing the gun rearward on the boom; and
   advancing the boom along the face in the direction of excavation and repeating the series, all the while performing substantially continuous mucking.

14. The rapid excavation method of claim 13, whereby excavated material is fractured and not crushed, resulting in minimal dust formation.

15. The sequential rapid excavation method of claim 13, whereby the fracture fragmentation of each series aids the breakage and fragmentation of the next series in succession through optimal borehole placement.

16. The method of claim 13, wherein the drilling comprises percussive drilling.

17. The method of claim 13, wherein the drilling comprises forming a borehole with stepped diameter and a preferred aspect ratio of about between 2:1 and 6:1.

18. The method of claim 13, in which the sealing comprises jamming of a helically wrapped sealing means into the borehole for preventing pressurized gas leakage.

19. Apparatus for breaking hard compact materials, such as rock and concrete, comprising:
   a charge-containing device for inserting into a hole drilled into the material;
   a seal wrapped around the device for sealing the device and containing high pressure gas in the hole;
   a charge in the device for generating a high-pressure gas which is then injected into the hole; and
   an ignition system for igniting the charge; for causing and effecting formation and propagation of a preferred fracture from a bottom of the hole such that a volume of the material is effectively fractured, broken and removed.

20. The apparatus of claim 19, further comprising an articulated boom connected to the device for aligning with the hole and inserting the device in the hole.

21. The apparatus of claim 19, further comprising an a rotational indexing means on the boom and a drill on the boom, for forming the hole with the drill and for indexing the drill out of alignment with the hole, and indexing the device into alignment with the hole.

22. A method for breaking hard compact materials, such as rock and concrete, comprising:
   drilling a hole in the material;
   containing a charge in a device;
   inserting a barrel of the device into the hole drilled into the material;
   wrapping a seal around a barrel of the device, sealing the device and containing high pressure gas in the hole;
   igniting the charge and causing the charge to burn;
   generating high-pressure gas from the burning charge;
   injecting the gas into the hole;
   forming and propagating a preferred fracture from a bottom corner of the hole; and
   breaking, fracturing and removing a volume of material.

23. The method of claim 22, further comprising aligning an articulated boom connected to the device with the hole and inserting the device in the hole.

24. The method of claim 23, further comprising indexing the boom and a drill on the boom for forming the hole with the drill and indexing the drill out of alignment with the hole, and indexing the charge-containing device into alignment with the hole.

* * * * *

UNITED STATES PATENT AND TRADEMARK OFFICE
CERTIFICATE OF CORRECTION

PATENT NO. : 5,098,163
DATED : March 24, 1992
INVENTOR(S) : Chapman Young, III

It is certified that error appears in the above-identified patent and that said Letters Patent is hereby corrected as shown below:

Column 1, line 5, insert

-- The invention was made with government support under Contract No. F04704-87-C-0022 concerning "Controlled Fracture Techniques for Rapid Excavation", awarded by H.Q. Ballistic Systems Division, Air Force Systems Command, Norton AFB, California 92409-6468. The government has certain rights in the invention. --

Signed and Sealed this

Fifth Day of January, 1999

Attest:

Attesting Officer

*Acting Commissioner of Patents and Trademarks*